United States Patent
Meyer et al.

(10) Patent No.: US 7,043,235 B2
(45) Date of Patent: May 9, 2006

(54) SECONDARY DATA ENCODED ALONG WITH ORIGINAL DATA FOR GENERATING RESPONSES TO REQUESTS FROM WIRELESS DEVICES

(75) Inventors: Shane D. Meyer, Redmond, WA (US); Craig G. Eisler, Redmond, WA (US); Brian C. Roundtree, Kirkland, WA (US)

(73) Assignee: Action Engine Corporation, Redmond, WA (US)

( * ) Notice: Subject to any disclaimer, the term of this patent is extended or adjusted under 35 U.S.C. 154(b) by 331 days.

(21) Appl. No.: 09/834,649

(22) Filed: Apr. 16, 2001

(65) Prior Publication Data

US 2001/0049277 A1    Dec. 6, 2001

Related U.S. Application Data

(60) Provisional application No. 60/182,330, filed on Feb. 14, 2000.

(51) Int. Cl.
*H04B 7/00* (2006.01)

(52) U.S. Cl. ............... 455/414.3; 455/466; 455/414.1; 455/412.1; 709/246; 705/14; 379/201.01; 379/201.02; 379/201.05

(58) Field of Classification Search ............... 455/466, 455/414.1–414.4, 412.1–412.2, 456.3; 709/246; 705/14; 379/201.01–201.02
See application file for complete search history.

(56) References Cited

U.S. PATENT DOCUMENTS

| 4,783,800 A | 11/1988 | Levine | 379/67 |
|---|---|---|---|
| 4,893,329 A | 1/1990 | O'Brien | 379/88 |
| 5,289,531 A | 2/1994 | Levine | 379/93 |
| 5,297,144 A | 3/1994 | Gilbert et al. | 370/95.2 |
| 5,327,144 A | 7/1994 | Stilp et al. | 342/387 |
| 5,355,472 A | 10/1994 | Lewis | 395/600 |
| 5,467,388 A | 11/1995 | Redd, Jr. et al. | 379/196 |
| 5,479,476 A | 12/1995 | Finke-Anlauff | 379/58 |
| 5,544,288 A | 8/1996 | Morgan et al. | 395/157 |
| 5,629,678 A | 5/1997 | Gargano et al. | 340/573 |
| 5,652,789 A | 7/1997 | Miner et al. | 379/201 |
| 5,652,867 A | 7/1997 | Barlow et al. | 395/500 |
| 5,696,497 A | 12/1997 | Mottier et al. | 340/825.44 |
| 5,737,491 A | 4/1998 | Allen et al. | 395/2.79 |

(Continued)

OTHER PUBLICATIONS

"Restaurantrow.com Offers Free Database", Dec. 14, 1999, (2) pages.

(Continued)

*Primary Examiner*—William Trost
*Assistant Examiner*—Sharad Rampuria
(74) *Attorney, Agent, or Firm*—Schwabe, Williamson & Wyatt, P.C.

(57) ABSTRACT

Encoding secondary data with original data for providing robust responses to requests from wireless devices. As a server receives data from various sources for wireless device users, it saves the data, associates it with the corresponding users, and sets flags to provide an indication of the secondary data. When the server receives a request from a wireless device, it can respond to the specific request and check the status of the flags for the user to determine if secondary data exists. If it has secondary data for the user, it encodes that data with original data for generating a response. Upon receiving the response, the wireless device obtains both the data for the original request and the secondary data, or an indication of it, representing other data pending for the user and providing the user with the data without necessarily requiring that the user submit specific requests for it.

34 Claims, 8 Drawing Sheets

U.S. PATENT DOCUMENTS

| | | | | |
|---|---|---|---|---|
| 5,774,803 | A * | 6/1998 | Kariya | 455/414.2 |
| 5,774,874 | A | 6/1998 | Veeneman et al. | 705/27 |
| 5,838,315 | A | 11/1998 | Craycroft et al. | 345/33 |
| 5,844,522 | A | 12/1998 | Sheffer et al. | 342/457 |
| 5,845,219 | A | 12/1998 | Henriksson | 455/567 |
| 5,862,325 | A | 1/1999 | Reed et al. | 395/200.31 |
| 5,872,841 | A | 2/1999 | King et al. | 379/209 |
| 5,893,127 | A | 4/1999 | Tyan et al. | 707/513 |
| 5,895,471 | A | 4/1999 | King et al. | 707/104 |
| 5,903,870 | A | 5/1999 | Kaufman | 704/275 |
| 5,930,700 | A | 7/1999 | Pepper et al. | 455/414 |
| 5,931,907 | A | 8/1999 | Davies et al. | 709/218 |
| 5,946,687 | A | 8/1999 | Gehani et al. | 707/10 |
| 5,948,061 | A * | 9/1999 | Merriman et al. | 709/219 |
| 5,953,393 | A | 9/1999 | Culbreth et al. | 379/88.25 |
| 5,963,949 | A | 10/1999 | Gupta et al. | 707/100 |
| 5,966,655 | A | 10/1999 | Hardouin | 455/418 |
| 5,970,449 | A | 10/1999 | Alleva et al. | 704/235 |
| 5,983,200 | A | 11/1999 | Slotznick | 705/26 |
| 5,991,723 | A | 11/1999 | Duffin | 704/260 |
| 6,006,221 | A | 12/1999 | Liddy et al. | 707/5 |
| 6,006,225 | A | 12/1999 | Bowman et al. | 707/5 |
| 6,021,181 | A | 2/2000 | Miner et al. | 379/88.23 |
| 6,029,135 | A | 2/2000 | Krasle | 704/275 |
| 6,038,534 | A | 3/2000 | Richards | 704/275 |
| 6,047,053 | A | 4/2000 | Miner et al. | 379/201 |
| 6,058,415 | A | 5/2000 | Polcyn | 709/200 |
| 6,061,718 | A | 5/2000 | Nelson | 709/206 |
| 6,064,980 | A | 5/2000 | Jacobi et al. | 705/26 |
| 6,065,120 | A | 5/2000 | Laursen et al. | 713/201 |
| 6,073,005 | A | 6/2000 | Raith et al. | 455/404 |
| 6,088,731 | A | 7/2000 | Kiraly et al. | 709/229 |
| 6,091,956 | A * | 7/2000 | Hollenberg | 705/14 |
| 6,157,814 | A * | 12/2000 | Hymel et al. | 340/7.56 |
| 6,167,253 | A | 12/2000 | Farris et al. | 455/412 |
| 6,173,316 | B1 | 1/2001 | De Boor et al. | 709/218 |
| 6,278,449 | B1 * | 8/2001 | Sugiarto et al. | 715/826 |
| 6,332,127 | B1 * | 12/2001 | Bandera et al. | 705/14 |
| 6,381,465 | B1 * | 4/2002 | Chern et al. | 455/414.1 |
| 6,397,057 | B1 * | 5/2002 | Malackowski et al. | 455/414.1 |
| 6,470,181 | B1 * | 10/2002 | Maxwell | 455/413 |
| 6,505,046 | B1 * | 1/2003 | Baker | 455/456.3 |
| 6,571,279 | B1 * | 5/2003 | Herz et al. | 709/217 |
| 6,650,902 | B1 * | 11/2003 | Richton | 455/456.3 |
| 2002/0028665 | A1 * | 3/2002 | Mankovitz | 455/186.1 |
| 2003/0027555 | A1 * | 2/2003 | Malackowski et al. | 455/414 |
| 2003/0032437 | A1 * | 2/2003 | Bossemeyer, Jr. et al. | 455/466 |
| 2003/0194990 | A1 * | 10/2003 | Helferich | 455/412.2 |

OTHER PUBLICATIONS

"Restaurantrow.com Announces Partnership with Myway.com", Nov. 11, 1999, (2) pages.

"Restaurantrow.com Launches "Top Table" and Opens the Doors to New York City's Most Sought After Restaurants", Oct. 28, 1999, (2) pages.

"Restaurant Row to Support CBS.com Onling Restaurant Guide, Allowing Visitors to Sample more Than 100,000 Menus", "Today's news".

Matthew W. Ragas, "Restaurant Row Sees Green on Their Plates",Apr. 29, 1998, (3) pages.

Alex Philippidis, "Restaurant Row Offers Diners Online Listings in 25 Countries",Business Journal, (3) pages.

Michael Creadon, "Traveler's Advisory", Jul. 21, 1997 vol. 150 No. 3, Time, (2) pages.

"Part II: Wireless LAN Medium Access Control (MAC) and Physical Layer (PHY) specifications", Jun. 26 1997, pp. 1-446.

Charles W. L. Hill, "Microsoft's Windows CE: Digital Devices and the Next Computing Paradigm", 1999, pp. 1-21.

"FIPA's First Call for Proposals", Oct. 1996, Foundation for Intelligent Physical Agents, pp. 1-30.

Stephen Downes, "Stephen's Web/Threads". Nov. 11, 1999, (12) pages.

"Mindmaker—Simply Intelligent", Category: Personal Productivity Software, Copyright 1999 by Mindmaker, Inc. (1) page.

"Prody Parrot—Your Intelligent, Personal Assistant", Copyright 1999 by Mindmaker, Inc., (1) page, Prody Parrot Helps You!.

Tim Musgrove, "Intelligent Personal Assistants with Advanced Speech and Gesture Recognition—Helping Users Control Applications, Navigate the Web, and Get Information", (4) pages, Feb. 1, 1999.

"http://www.luxlook.ocm/DetermineSite.process", Where are you Today?, (1) page.

"http://www.luxlook.com/DetermineSiteNoCookie.process-?Selected Country=United+States", Luxlook.com, (1) page.

"http://www.luxlook.com/gatxGiftSearch.process?RestartFlow=t", Luxlook.com, (1) page.

"http://www.luxlook.com/gatxGiftSearch.process?RestartFlow=t", Luxlook.com, (1) page.

"http://www.luxlook.com/gatxGiftSearch.process?RestartFlow=t&GoSearch-Submit&for2=W&personali", Luxlook.com, Search Results, (5) pages, Valentino, Versace.

"http://www.luxlook.com/en US/Templates/CS/cs about.tem", Who We Are, Luxlook.com, (1) page.

"http://www.gsmdata.com/cannes99/cannespaper.htm", Paper: Bluetooth Technology: The Convergence of Computing and Communications, (6) pages, GSM Data Knowledge Site—Stephen Nachtsheim, Feb. 25, 1999—GSM World Congress.

"http://www.wi-fi.org/index.html", Wireless Ethernet, (34) pages, Feb. 29, 2000, Wi-Fi-System Interoperability Test Plan, WECA Wireless Ethernet Compatibility Aliance.

"http://www.cisco.ocm/", Cisco Connection Online by Cisco Systems, Inc., All contents copyright 1992-200, Cisco Systems, Inc. Important Notices and Privacy Statement, (1) page.

"http://www.cisco.com/warp/public/44/jump/wireless.shtml", Cisco Wireless, General Information, (1) page.

"http://www.cisco.com/warp/public/cc/pl/witc/ao340ap/", Cisco—Cisco Aironet 340 Series Products, (2) pages.

"http://www.3com.com/", 3Com Home, (1) page.

"http://www.3com.com/wireless/index.html", 3Com Wireless Products and Technologies, (1) page.

"http://www.portico.com/", Home, (1) page.

"http://www.wildfire.com/company_background.html", Wildfire Background, (1) page, Wildfire's Genesis.

"http://www.wildfire.com/consumer_qa.html", consumer Q & A, (3) pages.

"http://www.phone.com/company/index.html", Phone.com—Company Page, (2) pages.

"http://www.phone.com/products/upbrowser.html", Phone.ocm—UP.Browser, (1) page.

"http://www.myaladdin.com/www/companyinfo/whoweare.jsp", Who We Are—myAladdin, (1) page.

"Adobe PostScript 3", The industry-standard printing and imaging technology, (2) pages.

Nadja Zol Ochs, "A Coast-to-Coast Cascade of Style Sheets", Oct. 14, 1997, (4) pages, msdn online—Web Workship.

"Choosing Between CSS and XSL", Microsoft XML 2.5 SDK—XSL Developer's Guide, 1999 Microsoft Corporation. All rights reserved. Terms of use.

3Com airconnect 11 Mbps Wireless LAN Solution Simple Connectivity When and Where You Need It, (6) pages.

Daniel L. Lough et al., "A Short Tutorial on Wireless LANs and IEEE 802.11"(5) pages.

3Com AirConnect, 3Com AirConnect Access Points, PC Cards and PCI Cards, (2) pages.

"Technical Summary of "IrDa Data" and IrDA Control", (4) pages.

"Infrared Data Association Serial Infrared Physical Layer Measurement Guidelines", Version 1.0, Jan. 16, 1998, (35 pages).

Timothy Masters, "Practical Neural Network Recipies in C++", IBM Disk included with source code for all programs, (Chaper 16, 17 and 18 with (3) coversheets).

http://www.lhsl.com/voicexpress/, "L&H Voice Xpress—Introduction—L&H", (2) pages.

http://www.nuance.com/index.htma?SCREEN=nuance7, Nuance—Products—Nuance7, "Nuance 7.0", (2) pages.

http://www.nuance.com/index.htma?SCREEN=speechobjects, Nuance—Products—SpeechObjects, "Nuance SpeechObjects", (3) pages.

"Bluetooth Protocol Architecture Version 1.0", (20) pages.

"Bluetooth Security Architecture Version 1.0", (33) pages.

"Mapping Salutation Architecture APIs to Bluetooth Service Discovery Layer Version 1.0", (26) pages.

"Test System Validation Guideline", Document No. 1.Q. 198/0.8 Jun. 9th 2000, Bluetooth, (19) pages.

* cited by examiner

SECONDARY DATA ENCODED ALONG WITH ORIGINAL DATA FOR GENERATING RESPONSES TO REQUESTS FROM WIRELESS DEVICES

REFERENCE TO RELATED APPLICATIONS

This application claims the benefit of priority of U.S. provisional patent application No. 60/182,330 filed Feb. 14, 2000 and entitled "Web-Based Personal Assistant Communication System and Method Therefor", and is related to the following applications, all of which are incorporated herein by reference as if fully set forth:

| U.S. Application Number | Filed | Entitled |
| --- | --- | --- |
| 09/615,660 | Jul. 14, 2000 | Web-Based Personal Assistant Communication Method |
| 09/616,468 | Jul. 14, 2000 | Web-Based Personal Assistant Communication System |
| 09/616,490 | Jul. 14, 2000 | Web-Based Personal Assistant User Interface System |
| 09/658,399 | Sep. 8, 2000 | System for Secure Electronic Transactions Using Unique Identifiers for Order-Related Information |
| 09/658,406 | Sep. 8, 2000 | System for Converting Textual Concepts to Interactive Audio and Audio/Visual Presentations |
| 09/658,407 | Sep. 8, 2000 | System for Obtaining Service-Related Information for Local Interactive Wireless Devices |
| 09/658,467 | Sep. 8, 2000 | Voice-to-Concept Conversion System |
| 09/658,468 | Sep. 8, 2000 | On-Line Service Provider Sign-Up System |
| 09/783,215 | Feb. 15, 2000 | Airline Flight Departure and Arrival Prediction Based Upon Historical and Real-Time Data |
| 09/783,608 | Feb. 15, 2001 | Rendering Data Using Rendering Instructions Based Upon Historical and Real-Time Data |
| 09/783,609 | Feb. 15, 2001 | Automated Reservation and Appointment System Using Interactive Voice Recognition |
| 09/783,610 | Feb. 15, 2001 | Assembling Personal Information of a Target Person Based Upon Third-Party Information and a Request Purpose |
| 09/783,611 | Feb. 15, 2001 | Hypertext Concept Notation For Dynamically Constructing a Sentence to Respond to a User Request |
| 09/783,616 | Feb. 15, 2001 | Automated Alert State Change of User Devices for Time-Based and Location-Based Events |

FIELD OF THE INVENTION

The present invention relates to an apparatus and method for encoding information for responding to a request from a wireless device to include both a response to the request and possibly secondary data for a user of the device.

BACKGROUND OF THE INVENTION

Wireless devices, such as cell phones and personal digital assistants (PDAs), are becoming more commonly used and have the potential for communication over the Internet in addition to traditional telephone networks. The Internet communication with these devices permits users to obtain services and other related information using wireless communication with the devices. For example, a user can download content from the world wide web on the Internet using a cell phone and have the information displayed on the display panel of the cell phone. Therefore, in addition to using the cell phone for voice communication, the user can obtain content over the Internet concerning, for example, services available from service providers. The user can also execute transactions over the Internet using the cell phone or other wireless device. For example, the user can make electronic purchases for good or services, analogous to how users can make transactions over the Internet using a personal computer having a connection to the Internet. Users can also send and receive e-mail via their wireless devices.

Wireless devices, however, tend to have limited processing capability via their browsers and are usually only in communication with a network for limited amounts of time. Due to the wireless communication of the devices, they must be in proximity to a wireless network transmitter/receiver, such as a cell phone tower, in order to communicate via the network. Also, the cost for wireless communication is usually much higher than conventional wireline communication, meaning that a wireless device cannot economically be continuously on the network while operating.

These aspects of wireless devices means that they must make specific requests to a server in order to obtain information. For example, in order to retrieve an e-mail message, a wireless device must make a specific request for pending e-mail from a server and have the server return the e-mail message. Likewise, if a user had ordered tickets via a wireless device, the user's wireless device must make a specific request for confirmation from a server to verify execution of the order. Therefore, for each piece of desired information, the user's wireless device must make a specific request. The server cannot "push" the information to the wireless device. This type of interaction can result in inefficient communications and require additional processing by wireless devices.

Accordingly, a need exists for enhanced responses to requests from wireless devices to provide additional information that may exist for the user beyond the requested information.

SUMMARY OF THE INVENTION

A method and apparatus consistent with the present invention provide a response to a request from a wireless device. A request is received from the wireless device associated with a particular user, and information is retrieved for responding to the request, possibly including secondary data for the user. The retrieved information is associated with the secondary data to generate a response, which is transmitted to the wireless device.

Another method and apparatus consistent with the present invention can be used by wireless devices for processing and presenting a response to a request. In response to a transmitted request associated with a particular user, a wireless device receives a response. It can determine that the response includes information for responding to the request and secondary data for the user, and it presents the response including at least an indication of the secondary data.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Introduction

Figure 1:
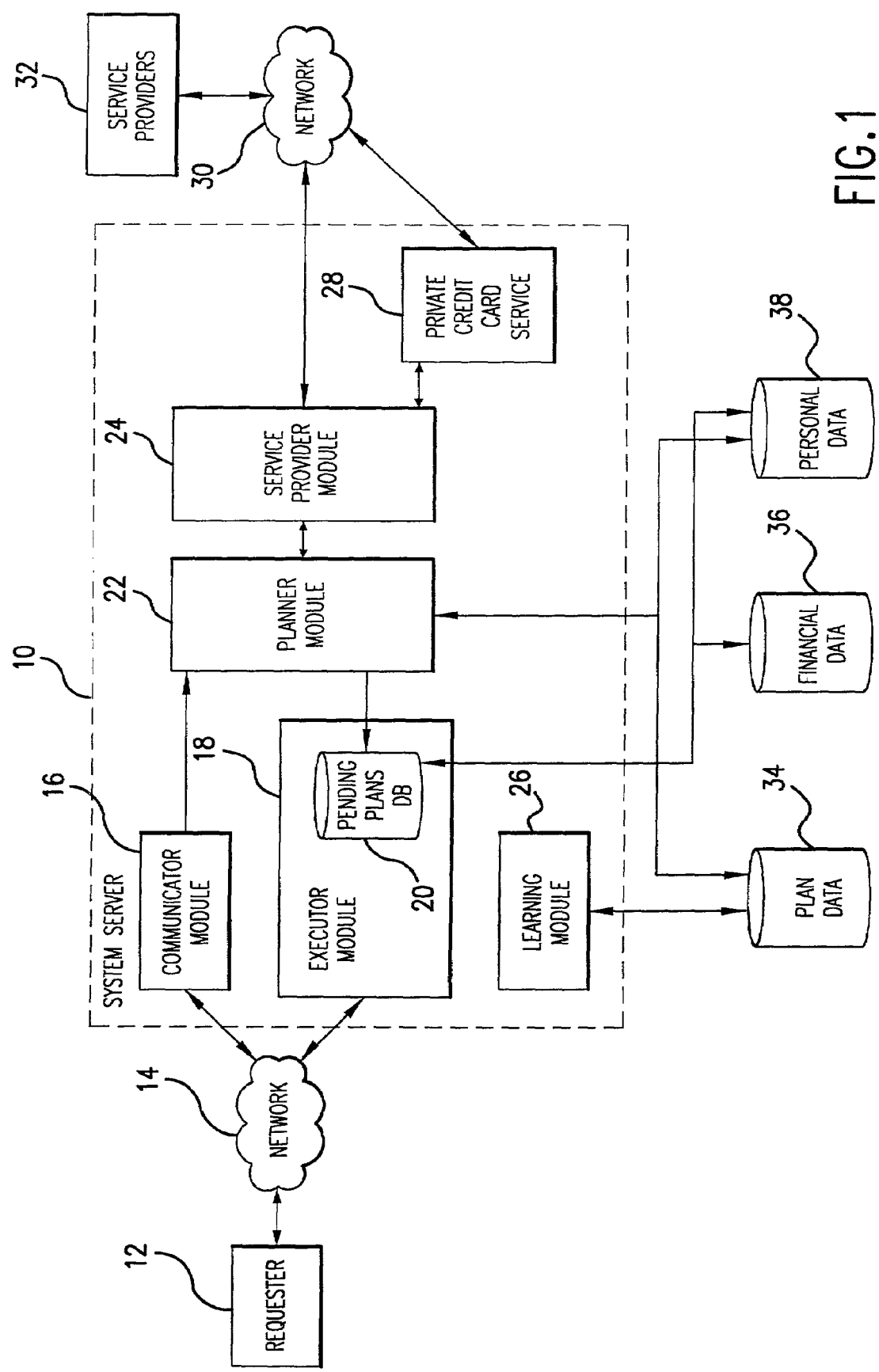
FIG. 1 is a diagram of a system for processing requests for service.

Embodiments consistent with the present invention provide various features for a web-based electronic personal assistant, as described in the web-based personal assistance applications identified above. The electronic personal assistant is implemented with a system server that the receives requests from users through wireless or wireline devices and processes the requests in order to provide the user with requested service or information. These features permit the user to interact with the system server in a variety of ways such as through a display on the device, a keyboard or keypad, or through voice interaction. The system server can present information to the user in a variety of ways as well, such as through audio communication or through information presented on a display with, for example, textual information, screens, or web pages presented with Hyper-Text Markup Language (HTML).

The requests, as explained in the web-based personal assistance applications identified above, can include any request for service or information. For example, a user may request a meeting, and in response the system server queries the user to obtain information required to arrange the meeting and then automatically makes the arrangements. As another example, a user may request information concerning services in a particular geographic location or based upon other parameters, and the system server can query the user to determine the type of information requested, such as particular types of retail establishments, and provide the information to the user. As another example, a user may request to purchase goods or services, or make reservations for services, and in response the system server queries the user to determine the type of goods or services desired as well as other information such as a desired price. Based upon that information, the system server automatically makes the purchase for the user. For the reservations example, the system server can query the user to determine information required to make the reservations for the user. For any request, the system server can access user preferences to obtain information required or useful to process the request, such as the user's credit card information and shipping address.

In addition, the system server can automatically notify the user of particular information. The system server typically maintains a database of preferences for the users in order to help process the requests. It also maintains a concept database and uses the concepts in order to retrieve and construct queries, such as text fragments, for the user. The use of only text fragments, for example, saves transmission time in comparison to transmission of graphical information over a network; alternatively, graphics can be used in addition to the text fragments.

Based upon the type of request, and potentially user preferences, the system server selects the appropriate queries from the concept database to obtain information to process the request. Upon completion of the processing, the system server can present to the user a sentence constructed from the related concepts in order to confirm the request. It can also use the sentence to document the request, retrieve the appropriate resources for it, and otherwise fulfill the request. This process, and the use of these concepts and the structure for a concept database, are further described in the web-based personal assistance applications identified above.

The system server can also cross-reference the concept database with a service provider database. In order to fulfill requests, the system server can access a database identifying available service providers for the request. At the end of each string of concepts in the concept database, that database can specify a link or pointer to the relevant service providers in the service provider database.

For example, if the request is for a meeting, once the system server has all the relevant information as constructed from the concepts, the concept for the location of the meeting can include a pointer or link to the establishments proximate the location and available to provide food for the meeting. Therefore, information for relevant service providers can be associated with the appropriate concepts in the concept database.

Request Processing

FIG. 1 is a diagram of a system for fulfilling a request for service. The system includes a system server 10 for processing a request transmitted from a requestor 12 through a network 14 such as the Internet or other wireline or wireless network. System server 10 includes several software modules for processing the request from requester 12. A communicator module 16 manages an interface for the communications with requestor 12 over network 14. Communicator module 16 receives the request and provides necessary formatting and other processing for transmitting it to a planner module 22.

Planner module 22 interacts with a service provider module 24 in order to obtain the resources for fulfilling the request. In particular, service provider module 24 interacts over a network 30, such as the Internet or a phone network, with one or more service providers 32 in order to obtain services to fulfill the request. Service provider module 24 provides for communication and data conversion for the interaction, while planner module 22 manages processing of the request and interacts with various databases for processing the request. A private credit card service module 28 can provide for secure order processing of the request to help safeguard users' personal information such as credit card numbers.

Once the planner module 22 has obtained the resources for the request, it communicates information to fulfill the request to an executor module 18. Executor module 18 includes a pending plan database 20 for storing and managing resources and other information to fulfill the request. Executor module 18 thus communicates back over network 14 with requestor 12 to provide confirmation of the request and also to execute the request.

A learning module 26 can provide for fine-tuning plan data within a database 34 in order to more efficiently process requests, particularly from the same requester. Other databases include a database 36 storing financial data accessed by executor module 18, and a database 38 storing personal data accessed by executor module 18 and planner module 22. The personal data can include an account for each user having a profile and preferences for the users, and the information can be indexed by a particular user identifier such as a phone number or code.

Table 1 illustrates a user account. As shown, the user accounts can include users' preferences for a wide variety of information such as for travel, dining, and other types of service providers. The user preferences can be continually updated and refined over time as the system server gathers more information concerning the user, and the system server can optionally use learning models for the refinements and use the preferences to make "smart choices" in processing users' requests. The information can be stored in a variety of ways such as in a relational database or with name-value pairs in Extensible Markup Language (XML).

TABLE 1

| user 1 identifier | data |
|---|---|
| contact | name, address |
| profile | user 1 characteristics |
| hotel information | user 1 hotel preferences |
| airline information | user 1 airline preferences |
| rental car information | user 1 rental car preferences |
| restaurant information | user 1 restaurant preferences |
| service provider preferences | user 1 service provider preferences |
| other category | user 1 preferences for the category |

Processing to fulfill the request is further explained in the web-based personal assistance applications identified above.

Network

Figure 2:
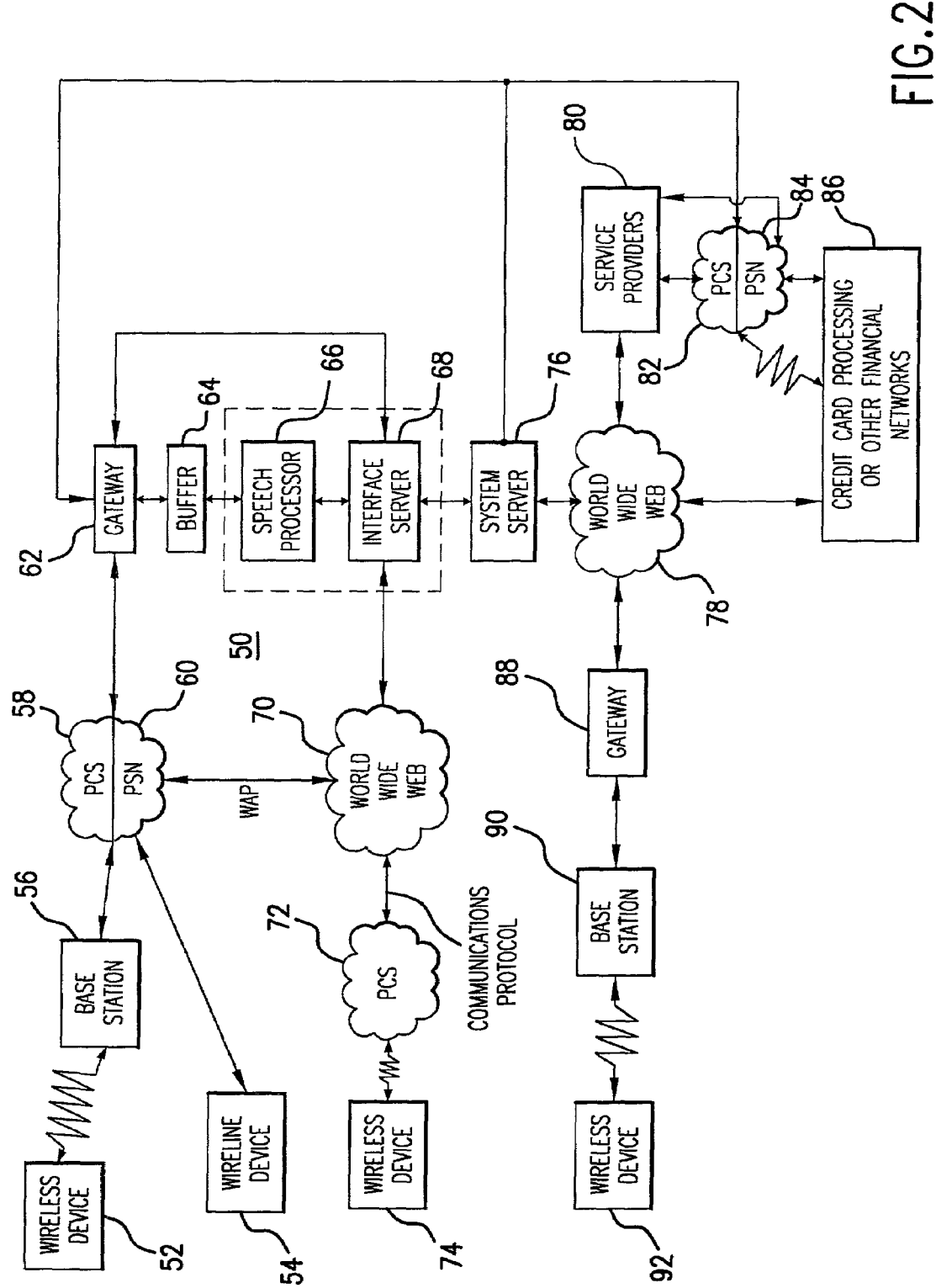
FIG. 2 is a diagram of a network for communicating with wireless and wireline devices and service providers to process requests for service.

FIG. 2 is a diagram of an exemplary network 50 illustrating interaction for receiving and processing requests from users such as requester 12. It illustrates how the system can receive requests through wireless and wireline transmission over conventional phone and cellular networks as well as the Internet or other computer networks. A requestor typically makes a request from a wireless or wireline device. The wireless devices include any device capable of wireless electronic communication and examples include the following: cellular phones; PDAs with wireless network access; wireless Internet appliances; personal computers (including desktop, laptop, notebook, and others) with wireless network access; and personal computers with microphones, speakers, and circuitry for permitting wireless phone calls. The wireline devices include any device capable of electronic wireline communication and examples include the following: conventional phones; PDAs with wireline network access; Internet appliances; personal computers (including desktop, laptop, notebook, and others) with wireline network access; and personal computers with microphones, speakers, and circuitry for permitting wireline phone calls.

A wireless device 52, for example, can interact through wireless transmission with a base station 56 for communication over a personal communication system (PCS) 58. A request may also be made from a wireline device 54 communicating over a public switched telephone network (PSN) 60. Systems for wireless and wireline communication, includes a PCS and PSN, are known in the art.

Communications through networks 58 and 60 are transmitted through a gateway 62 and potentially a buffer 64 to a speech processor 66 for performing processing of audio or particular types of communications, such as for voice-to-text conversion. Also, the communication may occur directly from gateway 62 to an interface server 68. Interface server 68 controls gateway 62, and it provides an interface between a system server 76 and gateway 62, speech processor 66, and the world wide web 70.

System server 76 corresponds with system server 10 in FIG. 1 to process user requests. Interface server 68 provides the data conversion and processing for transferring data to and from system server 76. As shown by the dashed line, speech processor 66 and interface server 68 can be implemented with the same physical machine or with different machines. Also, system server 76 can be implemented with one or more physical machines and can also be programmed to implement the functions of speech processor 66 and interface server 68.

In addition to receiving requests over networks 58 and 60, interface server 68 can receive a request over the world wide web 70. In particular, a wireless device 74 can interact through wireless communication with a PCS 72, which communicates over the world wide web 70 through a communication protocol such as, for example, the wireless application protocol (WAP). The WAP for communications over the Internet is known in the art.

System server 76 can communicate over the world wide web 78 with various service provides 80 to fulfill requests. In addition, system server 76 can communicate with credit card processing or other financial networks 86 in order to provide financial processing for fulfilling requests. Networks 86 can include known networks, including banking networks, for processing credit card transactions. As shown, service providers 80 and financial networks 86 can also send and receive communications through a PCS 82 and PSN 84.

System server 76 can communicate directly over the world wide web 78 to a gateway 88 and base station 90 in order to provide communication directly with a wireless device 92. Also as shown, communications can occur from system server 76 back through interface server 68 and speech processor 66 to the end user wireless devices 52 and 74 and wireline device 54; system server 76 can also communicate directly with gateway 62, as shown. Those communications can provide, for example, confirmation of a request or information responsive to a request.

Network 50 illustrates fundamental hardware components for communications over the various types of networks shown. As known in the art, network 50 can include additional components and can also include components for providing services known in the art with respect to phone calls. For example, it can include a caller ID service to provide system server 76 with the phone number of the user's wireless or wireline device originating a communication. Also, network 50 can include other means for communication of data such as through satellite transmission. For transmission over the Internet, network 50 can use Transmission Control Protocol/Internet Protocol (TCP/IP) or other protocols.

Server Components

Figure 3:
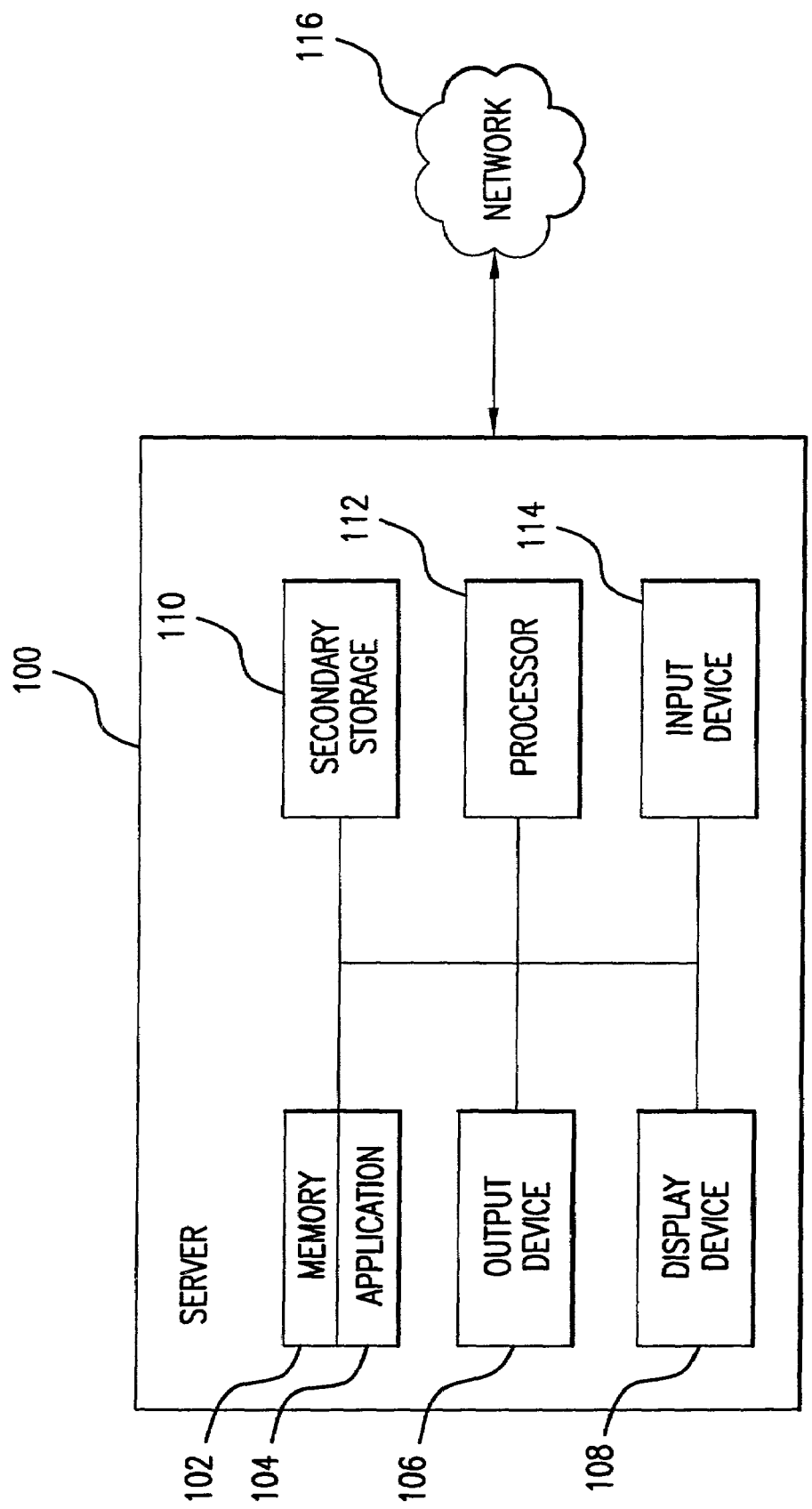
FIG. 3 is a diagram of exemplary components of a server for processing requests for service.

FIG. 3 depicts a server 100 illustrating exemplary hardware components of system server 10 and other machines used by the system, such as speech processor 66 and interface server 68. Server 100 includes a connection with a network 116 such as the Internet or other type of computer or phone networks, which may correspond with the networks shown in FIGS. 1 and 2. Server 100 typically includes a memory 102, a secondary storage device 110, a processor 112, an input device 114, a display device 108, and an output device 106.

Memory 102 may include random access memory (RAM) or similar types of memory, and it may store one or more applications 104 for execution by processor 112. Applications 104 may correspond with software modules to perform processing for the functions described below. Secondary storage device 110 may include a hard disk drive, floppy disk drive, CD-ROM drive, or other types of non-volatile data storage, and it may correspond with the various databases shown in FIG. 1. Processor 112 may execute applications or programs stored in memory 102 or secondary storage 110, or received from the Internet or other network 116. Input device 114 may include any device for entering information into server 100, such as a keyboard, key pad, cursor-control device, touch-screen (possibly with a stylus), or microphone. Display device 108 may include any type of device for presenting visual information such as, for example, a computer monitor, flat-screen display, or display panel. Output device 106 may include any type of device for presenting a hard copy of information, such as a printer, and other types of output devices include speakers or any device for providing information in audio form. Server 100 can possibly include multiple input devices, output devices, and display devices.

Although server 100 is depicted with various components, one skilled in the art will appreciate that this server can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling server 100 to perform a particular method.

Wireless Device Components

Figure 4:
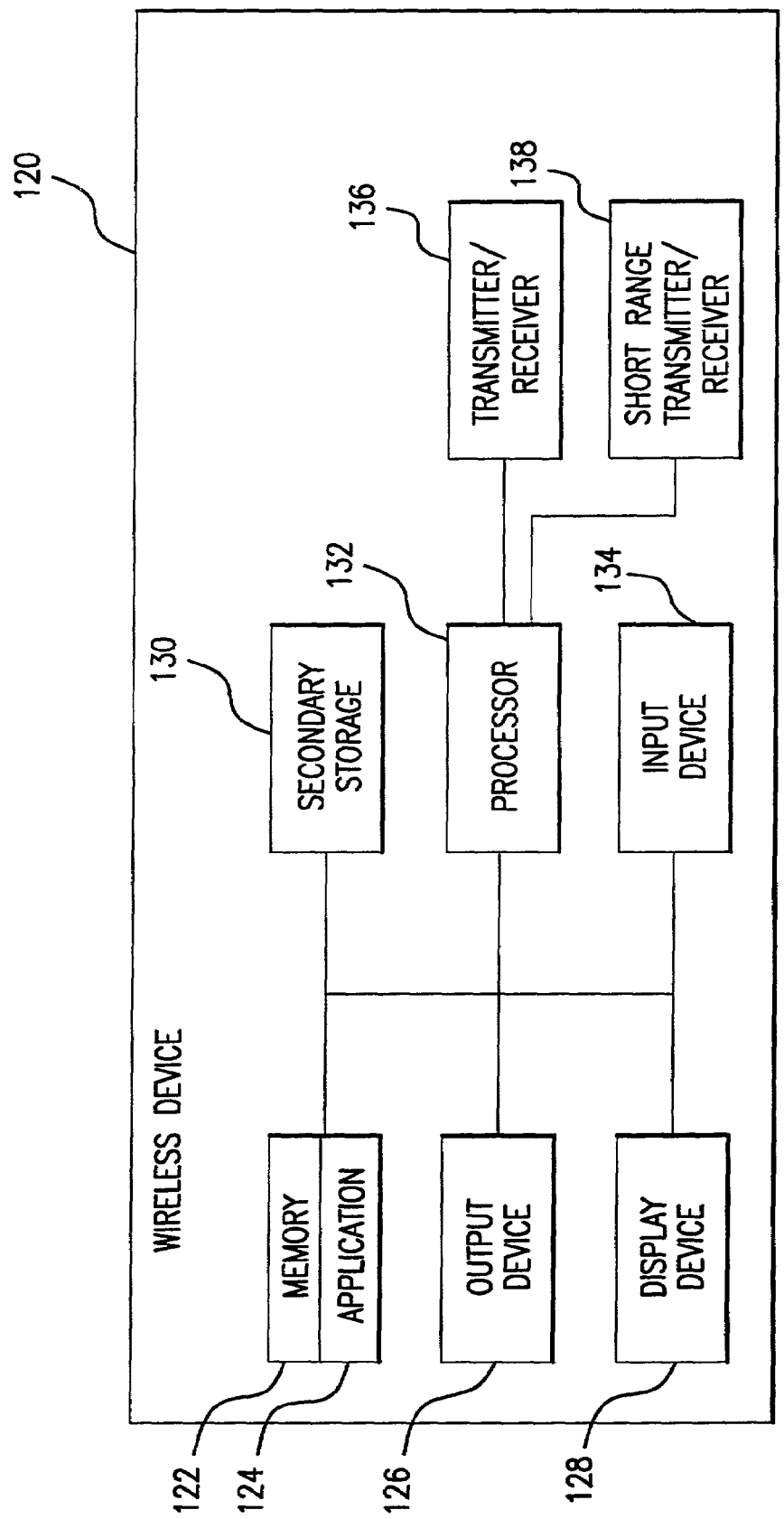
FIG. 4 is a diagram of exemplary components of a wireless device.

FIG. 4 illustrates exemplary hardware components of a wireless device 120, which may correspond with the exemplary wireless devices identified above. Wireless device 120 typically includes a memory 122, a secondary storage device 130, a processor 132, an input device 134, a display device 128, an output device 126, a transmitter/receiver 136, and a short range transmitter/receiver 138.

Memory 122 may include RAM or similar types of memory, and it may store one or more applications 124 for execution by processor 132. Applications 124 may correspond with software modules to perform processing for the functions described below, and they may also include web browser programs for retrieving and displaying content from the Internet. Secondary storage device 130 may include a hard disk drive, floppy disk drive, CD-ROM drive, or other types of non-volatile data storage such as a ROM. Processor 132 may execute applications or programs stored in memory 122 or secondary storage 130. Input device 134 may include any device for entering information into wireless device 120, such as a keyboard, key pad, cursor-control device, touch-screen (possibly with a stylus), or microphone. Wireless device 120 can include multiple input devices; for example, it can include both a microphone and key pad for a cell phone. Display device 128 may include any type of device for presenting visual information such as, for example, a computer monitor, flat-screen display, or display panel. Output device 126 typically includes a speaker for providing information in audio form. It can also include a device for providing a hard copy of information such as a printer, or provide a port for a connection to a printer. Wireless device 120 can possibly include multiple input devices, output devices, and display devices.

Transmitter/receiver 136 provides for wireless communication with phone networks or computer networks such as is shown in FIGS. 1 and 2. Transmitter/receiver 136 can be implemented with known RF transmitters and receivers for providing cellular transmission between wireless device 120 and base stations such as base stations 56 and 90, or it can be implemented with a wireless transmitter/receiver for other types of communication such as a satellite transmission.

Short range transmitter/receiver 138 provides for wireless short range communication with other wireless devices, and it can be implemented with transmitters and receivers that operate according to the IEEE standard 802.11 for local wireless networks or according to the standard referred to as the Bluetooth® technology for direct wireless communication between local interactive wireless devices; that technology is explained in, for example, the Specification of the Bluetooth System, Core, v1.0 B, Dec. 1, 1999 and the Specification of the Bluetooth System, Profiles, v1.0 B, Dec. 1, 1999, both of which are incorporated herein by reference.

In addition, even if a wireless device does not contain short range transmitter/receiver 138, technology exists to obtain an approximate geographic location of certain wireless devices. In particular, using multiple base stations the signal from a cellular phone, for example, can be triangulated in order to obtain an approximate geographic location of the cellular phone, including an indication of its vertical (altitude) location.

Although wireless device 120 is depicted with various components, one skilled in the art will appreciate that this wireless device can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling wireless device 120 to perform a particular method.

Exemplary hardware components for wireline devices, such as the examples provided above, can include the same components as wireless device 120 except without the transmitter/receiver 136 and the short range transmitter/receiver 138.

Secondary Data Encoding for Responding to Requests from Wireless Devices

Secondary data encoding can be used to provide robust and dynamic responses to requests from users of wireless devices. When a request from a wireless device is received, the system looks up the user for the wireless device and can determine if secondary data exists for the user. In other words, in addition to responding to the specific request, the system can retrieve other information for the user and send that information, or an indication of it, back to the wireless device with a response to the original request. In that manner, a user of a wireless device need not necessarily request particular types of information or responses to each particular transaction.

For example, a user may request a reservation for services such as an airline reservation. The system can execute that transaction and determine, for example, that an e-mail message is pending for the user. When transmitting confirmation of the reservation to the user, the system also transmits the e-mail message or an indication of it. Therefore, the user need not necessarily specifically make a request for any pending e-mail messages, as the system can send them back in response to other requests. Likewise, as another example, if a user requested any pending e-mail messages, the system can send both the e-mail messages and any pending confirmation of previously-requested reservations or an indication of them. These examples are provided for illustrative purposes only, and the processing of secondary data can include any type of information, transactions, and requests from wireless devices.

Figure 5:
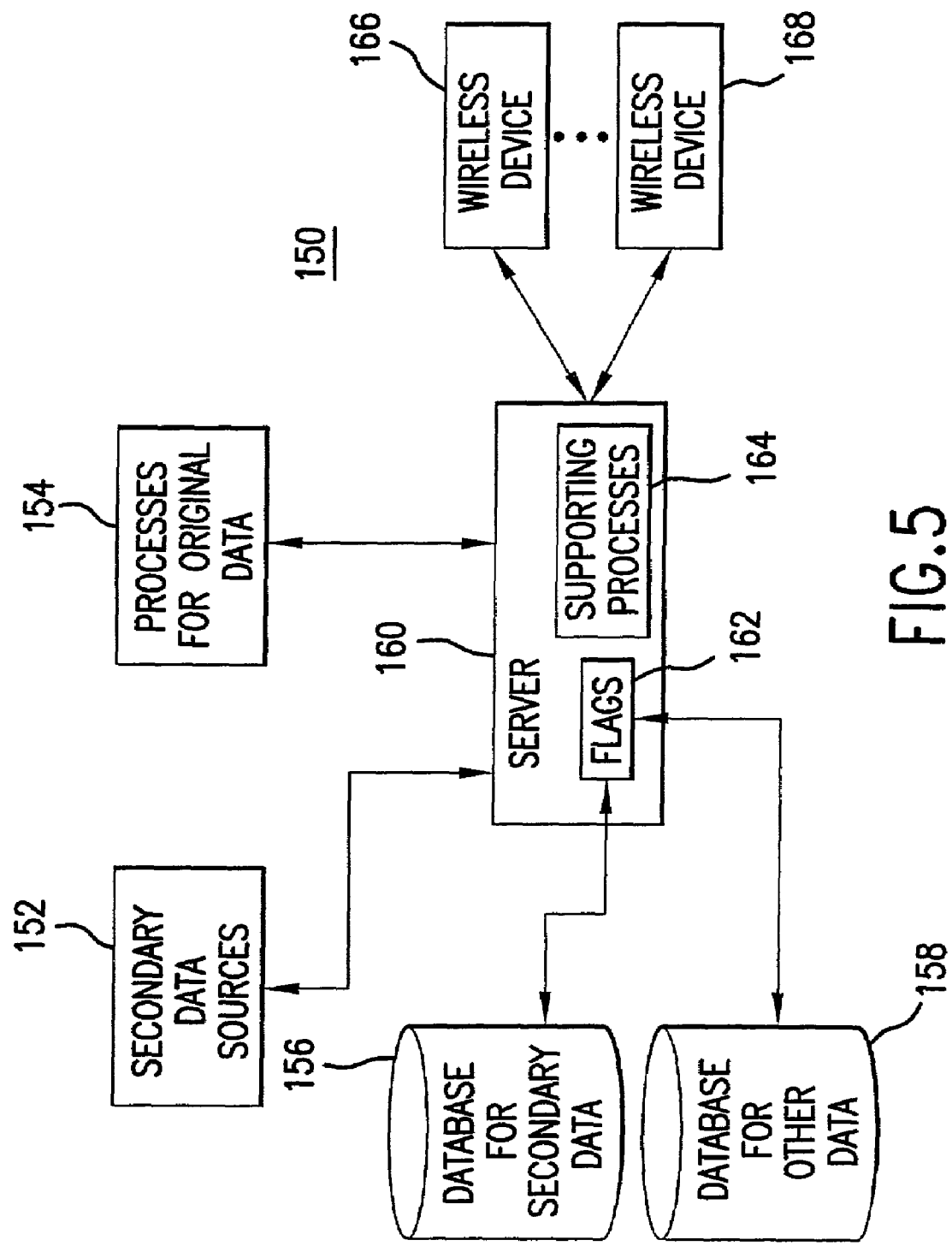
FIG. 5 is a diagram conceptually illustrating the encoding of secondary data with original data for generating responses to requests from wireless devices.

FIG. 5 is a diagram of a system 150 conceptually illustrating the encoding of secondary data with original data for generating responses to requests from wireless devices. A server 160, which may be implemented with system server 10 identified above, can receive requests from various wireless devices 166 and 168, and transmit responses to them. Wireless devices 166 and 168 may correspond with wireless device 120 identified above or with other wireless devices. The requests and responses can be transmitted over wireless and other networks as identified above. Server 160 can access various processes 154, possibly remote, for processing a request and generating a response to it. Server 160 can also receive information from secondary data sources 152, possibly remote as well. The secondary data sources 152 can provide, for example, information for execution of a transaction for a user of one of the wireless devices 166 and 168. For example, secondary data sources 152 can execute a process in response to a user request such as making an on-line purchase or providing reservations for services. They can also provide information from third party sources such as, for example, an e-mail message not necessarily delivered in response to a request or e-mail message by the user.

The processes 154 for the original data request can involve, for example, one or more responses sent back to the user at one of the wireless devices for executing transactions. For example, if a user requests a reservation for services, a process 154 can send back an immediate response confirming receipt of the request. When the reservation is actually made, a secondary data source 152 can send back to the server confirmation of the reservation for subsequent transmission to the wireless device. Executing a transaction or performing other processing for a request can involve, for example, a time delay or execution of multiple processes. A user's wireless device is not necessarily on-line and accessible during that time. Therefore, information for responding to a user's request cannot necessarily be sent immediately back to the user's device.

Server 160 can use flags 162 to indicate that secondary data exists for a user. The flags can provide that indication if, for example, the user's wireless device is not on-line and accessible. The flags 162 can be linked to secondary data 156 in a database. Server 160 can also access other databases 158 for retrieving information for a user, including information for responding to a user's request sent via one of the wireless devices 166 and 168. The databases can include, for example, those databases described above. Server 160 can include supporting processes 164 for managing the status of the flags and for use in responding to user's requests.

Table 2 illustrates conceptually the use of flags to indicate data for particular transaction. The information in Table 2 can be stored in any type of data structure accessible by the server. Each type of transaction can have, for example, a separate flag, as different types of transactions may involve different processes. The flags can be implemented with any type of indication, and they can possibly be combined to use one flag for multiple transactions. Each flag can also be linked with any actual data for the transaction in databases 156 and 158, for example. This type of data structure can be repeated for each user and associated with user identifiers, and the server can thus electronically maintain an account, for example, for each user specifying pending secondary data for the user. The user identifiers can include any information to identifier the user. User identifiers also typically identify or are associated with an identification of the user's wireless device so that the system can communicate with the wireless device over a network.

TABLE 2

| User X | | |
| --- | --- | --- |
| transaction | flag | link to secondary data |
| transaction type 1 | flag 1 | link 1 |
| transaction type 2 | flag 2 | link 2 |
| ... | ... | ... |
| transaction type N | flag N | link N |

Figure 6:
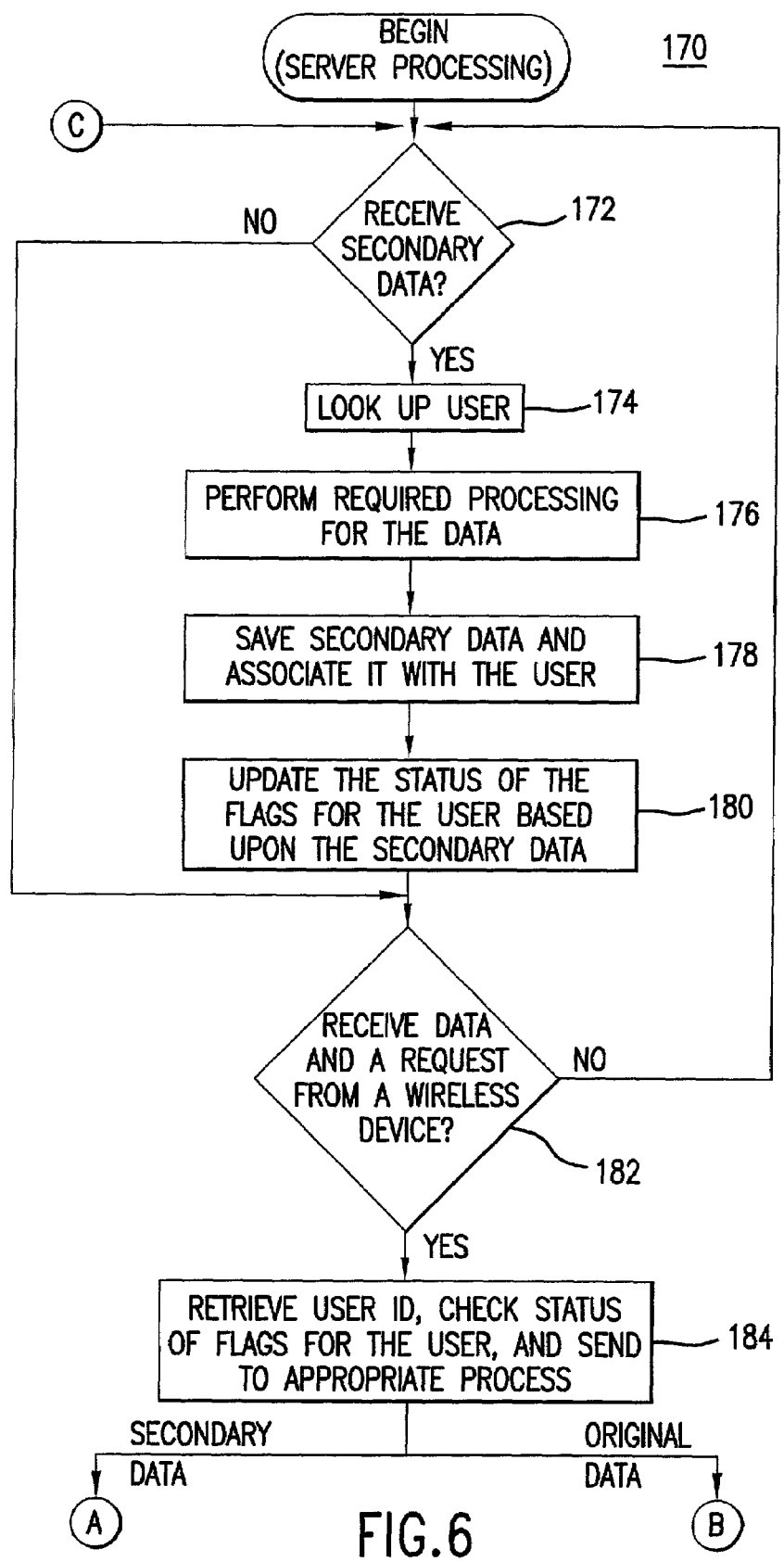
FIGS. 6 and 7 are a flow chart of a method executed by a server to encode secondary data with original data for generating responses to requests from wireless devices.
Figure 7:
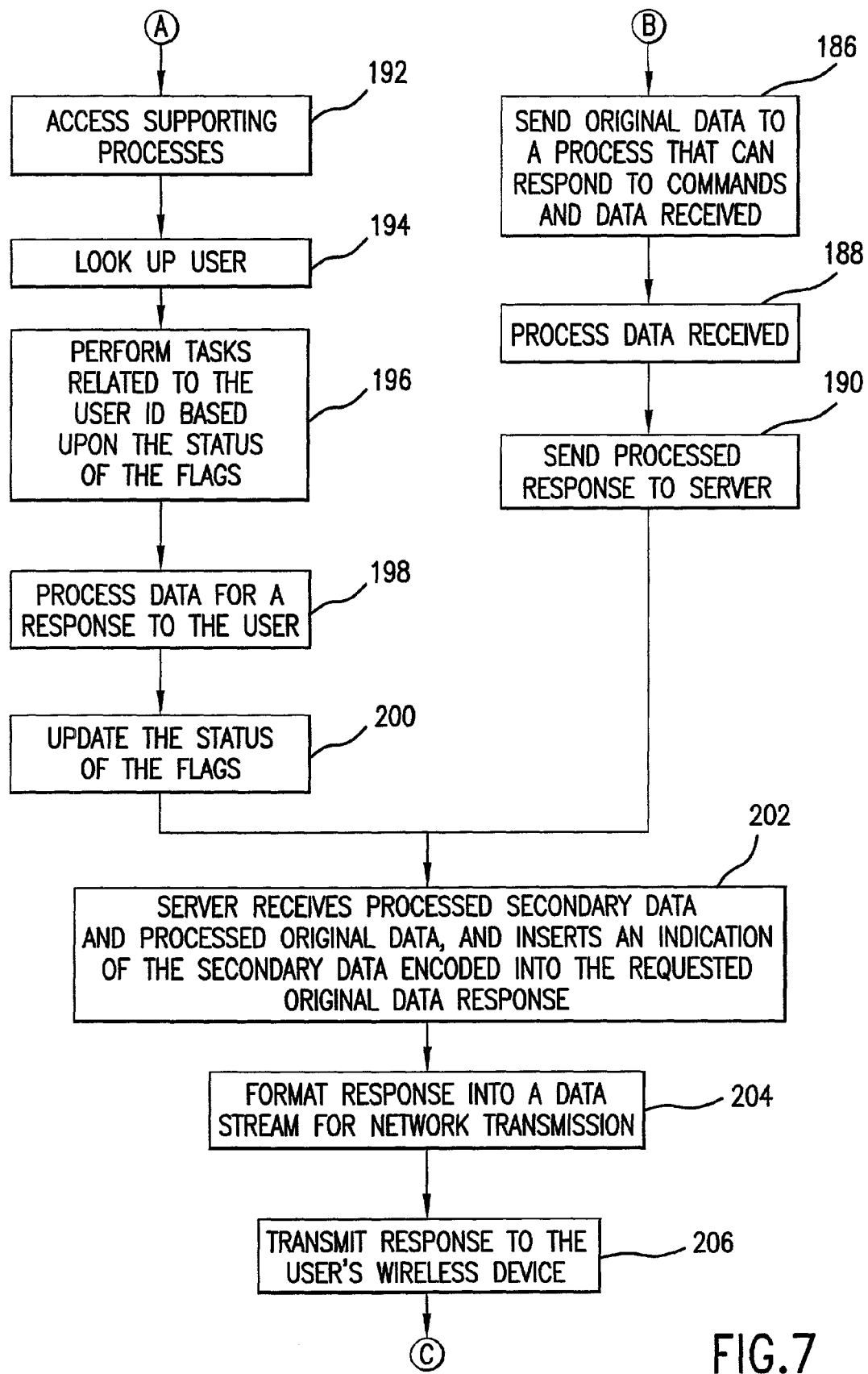

FIGS. 6 and 7 are a flow chart of a method 170 executed by a server to encode secondary data with original data for generating responses to requests from wireless devices 166 and 168. Method 170 can be implemented in software modules within a server such as server 160. In method 170, the system, for example system 150, determines if it receives secondary data for a user (step 172). Secondary data includes any information for transmission to a user of a wireless device. Secondary data can include information sent in response to a request or include information from third party or other sources. For example, it can include confirmation of a reservation sent in response to a request, and it can also include an e-mail message for the user that is not necessarily sent in response to any communication from the user.

If the system receives secondary data, it can look up a user for the data (step 174) and access supporting processes 164 to perform any required processing for the data (step 176). Looking up the user can involve accessing the user's account specifying the status of the flags. The system saves the secondary data, for example in database 156, and associates the data with the user (step 178). Based upon the type of data or corresponding transaction, the system configures a flag in the user's account, for example, to indicate the presence of the secondary data and, as illustrated above, can link the flag with the data (step 180).

The system also determines if it receives data and a request from a wireless device, such as wireless devices 166 and 168 (step 182). These requests are typically sent from the wireless devices over a network such as those networks identified above. The requests may be sent as, for example, HyperText Transport Protocol (HTTP) requests from a browser in the wireless device for communication over the Internet or other IP network. Alternatively, the requests can be sent via any application in a wireless device according to any protocol.

The requests can include any type of communication relating to a transaction. For example, the requests can involve on-line purchases of goods or services, requests for reservations for services, requests for pending e-mail messages, or requests for information. Likewise, the corresponding responses can include, for example, confirmation that the purchases were executed possibly with delivery of information for the purchase, confirmation of the reservation, e-mail messages, or the requested information.

A request may involve multiple inquiries for the same transaction, and responses may also include multiple communications for the same transaction. For example, a user may request a particular reservation and, in response, the server may communicate that the requested reservation is not available and offer alternative reservations. The user may then request one of the alternative reservations, and the server confirms that reservation. The single transaction in this example, the request for a reservation, involves multiple communications for the confirmation of it.

If the system receives a request, it performs processing for the request and secondary data, if present, for the user. In particular, the system obtains a user identifier associated with the request, checks flags for the user, and sends the request to the appropriate processes (step 184). The user identifier can be used to access the flags in the user's account, for example, and the system can check each flag status to determine if secondary data for corresponding transactions exists for the user. If a flag is set, for example, or otherwise indicates the presence of secondary data, the system can also determine the type of transaction associated with the secondary data, as different types of transactions can involve different processing of the information.

The system performs processing for the original request. In particular, it can send the original request and data to process 154, for example, that can respond to commands and data received (step 186). That process can then perform processing for the request (step 188), and the particular processing may depend upon the type of request and resources or information required to respond to it. The processing can occur within the server or involve a remote process. For example, the server may need to contact other entities for processing a request for a purchase or a reservation. The process, after executing the request, sends a processed response (step 190). If executed remotely, for example, the processed response is sent back to server 160.

If secondary data exists for the user, as determined in step 184, the system performs processing for the secondary data. As illustrated, the processing of secondary data can occur in parallel to the processing of the original request. Alternatively, they can be performed together or as sequential processes. The system can access supporting processes 164 (step 192), which can look up the user (step 194) and perform tasks relating to the user identifier based upon, for example, the status of the flags (step 196). The tasks can involve, for example, processing required to provide the secondary data to the user, and any type of supporting process or processes can be accessed or used.

Transactions can involve various processing and the tasks can relate, for example, to individual processing for a particular transaction. For example, a purchase transaction may require a credit card processing and confirmation of a desired delivery for the product. As another example, a request for a reservation may require a credit card number or other financial instrument to hold the reservation. Tasks can also involve, for example, accessing user preferences or information identifying a user's wireless device in order to determine how to send the data to the user. For example, if a user's wireless device does not have a display, then a task for an e-mail message can involve converting the text of the message into a corresponding audio file for transmission to the user.

The supporting processes perform their processing using, for example, the data as linked with the flags or otherwise associated with the user (step 198). The system can also update the status of the flags for this user (step 200). For example, the status can be changed to indicate that the secondary data was provided to the user or, if it cannot be provided, the status can be left intact to indicate that secondary data still exists for the user.

After processing the original request and the secondary data, if present, the system can generate a response for transmission to the user. The system receives the processed secondary data and the processed original data and, for example, associates them for transmission by inserting an indication of the secondary data encoded into the original data response (step 202). For example, the system can concatenate the data into a single, or possibly multiple, data streams response using XML tags or other codes to identify the portions of the data. The codes can indicate, for example, the existence of secondary data, and the user's wireless device can use that indication to likewise present to the user the indication of the secondary data. For example, the indication can include an icon or other identifier displayed to the user on the wireless device and permitting the user to select the icon to retrieve and access the secondary data. Therefore, the indication of the secondary data can include the actual secondary data; it can include an indicator such as, for example, a flag indicating to the user that secondary data exists for the user on the server; or it can include both. If it includes an indicator, that information can be used to retrieve the secondary information from the server. The indicator can also be configured to indicate a type of secondary data such as, for example, an e-mail message or a transaction confirmation.

The system formats the response into a data stream (step 204). The formatting can involve, for example, any formatting required for network transmission of the data stream such as formatting for communication protocols identified above. The formatting can also involve, for example, inserting codes or instructions in the data to indicate to the wireless device how to present the data such as the instructions as described in the related application identified above for rendering data. It could include, for example, accessing the user preferences to determine how to present the response based upon the user's desired type of presentation. The system then transmits the response to the user's wireless device via a network (step 206), and it returns to step 172 to repeat the method for additional secondary data and requests.

Figure 8:
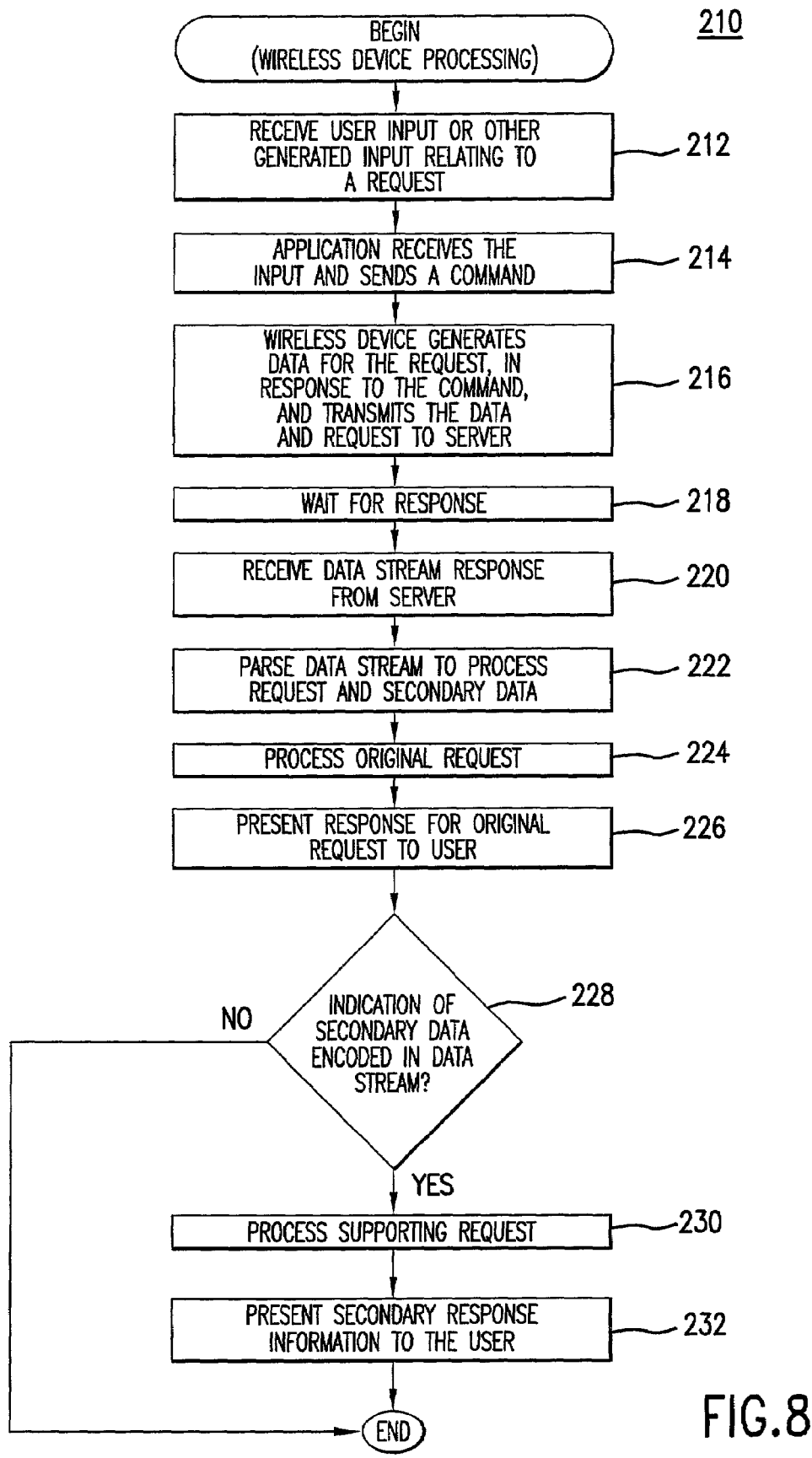
FIG. 8 is a flow chart of a method executed by a wireless device to process and present to the user the secondary data along with the original data.

FIG. 8 is a flow chart of a method 210 for execution by a wireless device, such as wireless devices 166 and 168, to process and present secondary data along with the original data. Method 210 can be implemented in software modules for execution by browser or other application in a wireless device such as those described above. In method 210, a wireless device receives a user input or other generated input relating to a request (step 212). For example, a user may enter a request into the wireless device using an input device such as a touch screen with a stylus. Alternatively, a request can be generating programmatically, by an application in the wireless device, or by an external entity communicating with the wireless device.

An application in the wireless device receives the request and sends a command to generate data for sending the request to the system server (step 214). The wireless device generates the data for the request and transmits the data and request to the system server such as server 160 (step 216). This transmission can involve, for example, use of a browser in the wireless device to send the request over the Internet or other IP network. The transmission can also involve, for example, the networks and protocols identified above. If the wireless device remains on-line in communication with the network it waits for a response (step 218).

The wireless device receives a data stream response from the system server (step 220). It can receive the response via, for example, the networks and communication protocols identified above. The wireless device parses, or otherwise processes, the received data stream to process the request it has previously sent (step 222). The parsing can include detecting and identifying codes in the data stream, for example XML codes, in order to retrieve and present the original and any secondary data. Those codes can include, for example, flags indicating that secondary data exists on the system server, and the wireless device can use the flags to retrieve the secondary data from the server. As identified above, the flags can also indicate a type of data represented by the secondary data. Alternatively, if the actual secondary is encoded into the data stream, then the wireless device need not necessarily retrieve it from the system server. By parsing the data stream, therefore, the wireless device can determine if secondary data exists for the user, either by detecting the actual secondary data or detecting an indication of it and subsequently retrieving it from the system server.

The parsing can also include decoding any instructions in the data stream, or links to instructions, for determining how to present the data to the user. The instructions may be based upon, for example, user preferences specifying how the user desires to be presented with responses.

The wireless device processes the original request in order to present the response received from the system server to the user (step 224). The presentation can involve, for example, a visual display on the wireless device or an audible presentation (step 226). The presentation can occur using a browser program, for example, in the wireless device. The processing for the response to the original request can depend, for example, on the type of transaction represented by the request and requirements to display or present the corresponding information.

If the wireless device detects an indication of secondary data in the data stream (step 228), it processes the supporting request as determined by the indication of the secondary data (step 230). The processing for the secondary data can depend, for example, on the type of transaction represented by the secondary data and requirements to display or present the corresponding information. It can include using a flag in the data stream, for example, to retrieve the secondary data from the system server, if an indicator for it is provided rather than the actual secondary data.

The wireless device, upon decoding and processing the secondary data, presents the secondary response information to the user (step 232). That response can also involve, for example, a visual or audible presentation, possibly in conjunction with presentation of the response for the original request. Accordingly, even though not specifically requested, a user can receive other information intended for the user in response to the original request.

Tables 3 and 4 provide an example of an XML data stream request and response to illustrate the secondary data encoding. Table 3 provides an example of a weather forecast request for Seattle posted to the server from a wireless device. The planner module in the server receives this data stream as a "submitConcepts" message and can process the concepts as described above. Table 4 provides an example of a response sent by the server to the wireless device in response to the request shown in Table 3. As illustrated in the response, in this example the nm="3" tag means that the user has three new messages and the ns="2" tag means that the user has two unacknowledged solutions, and both the messages and the solutions are unrelated to the request for the weather forecast. Those tags thus provide an indication of the secondary data, the messages and the solutions, in this example. The wireless device can use those tags in order to present to the user an indication of the secondary data by, for example, displaying on the wireless device text stating that the user has two messages and three solutions pending. The example shown in Tables 3 and 4 is provided for illustrative purposes only, and implementations of the present invention can use any type of requests, tags, and responses, and the requests and responses can be transmitted using other types of languages or protocols.

TABLE 3

```
<submitConcepts type="goal">
  <user i="shane" p="******" e="y"/>
  <dev i="NOT_AVAILABLE" t="Palm" o="v.3.2" v="200104032232" l="en_US"/>
  <c i="w1"></c>
  <c i="35"></c>
  <c i="4"><airportCode>SEA</airportCode></c>
</submitConcepts>
```

TABLE 4

```
<ae nm="3" ns="2" id="328 1454273156">
  <o i="ADvCDgAAAOWrmbrFgACsHGNe">
    <s i="ADvCDgAAAOWrmbrFgAKsHGNe" t="Current conditions for Seattle, WA - 4/4"
    g="Weather" r="99" s="f" h="Weather forecast:"d=
    "20010404162135">
      <g i="0" t="Current conditions for Seattle, WA - 4/4" I="wea">
        <I t="s" w="1" l="Weather station" v="Seattle, WA
8002#"/>
        <I t="s" w="1" l="Conditions" v="Mostly Sunny"/>
        <I t="s" w="1" l="Temperature" v="48 Deg. F...
        (truncating)
```

While the present invention has been described in connection with an exemplary embodiment, it will be understood that many modifications will be readily apparent to those skilled in the art, and this application is intended to cover any adaptations or variations thereof. For example, various types of wireless devices, hardware components for the devices and servers, and types of network transmissions may be used without departing from the scope of the invention. This invention should be limited only by the claims and equivalents thereof.

What is claimed is:

1. A method for a server to provide a response to a request for service from a wireless device, comprising:
   receiving by the server the request for service from the wireless device;
   determining by the server one or more associated service providers based at least in part on the service requested;
   retrieving by the server from one or more other servers of the one or more service providers primary response data for responding to the request;
   determining by the server whether secondary data unrelated to responding to the request are to be provided to the wireless device;
   associating by the server the primary response data, retrieved from the one or more servers of the one or more service providers, with either one or more indications of locations of the secondary data or at least a portion of the secondary data;
   generating by the server an expanded response to the request, including the primary response data and the portion or the indication(s) of the location(s) of the secondary data; and
   transmitting by the server the expanded response to the request to the wireless device.

2. The method of claim 1 wherein the generating includes:
   generating a data stream containing the retrieved primary response data and the portion or indication of the secondary data; and
   formatting the data stream for transmission to the wireless device.

3. The method of claim 1 wherein the determining includes:
   obtaining an identifier for a user related the wireless device; and
   performing at least one task related to the user's identifier.

4. The method of claim 1 wherein the retrieving includes sending the request to a process that can respond to commands.

5. The method of claim 1 wherein the determining includes checking a status of a flag associated with a transaction type.

6. The method of claim 5 further including updating the status of the flag.

7. The method of claim 1 wherein the associating includes providing a first indication identifying the retrieved primary response data and a second indication identifying the secondary data, for inclusion within the expanded response to be generated.

8. The method of claim 1 further includes receiving the secondary data to provide an indication of the existence of saved secondary data.

9. A method for processing and presenting via a wireless device a response received from a server to a request for service from the wireless device, comprising:
   transmitting to a server from a wireless device a request for service;
   receiving a response from the server to the request for service;
   determining whether the response includes primary response data retrieved from one or more servers of one or more service providers for responding to the request and either one or more indication(s) of the location(s) of the secondary data or at least a portion of secondary data unrelated to the primary response data; and
   presenting the response including either the portion or the indication(s) of the locations of the secondary data.

10. The method of claim 9 wherein the receiving includes receiving a data stream having the portion or the indication(s) of the location(s) of the secondary data encoded with the primary response data.

11. The method of claim 10 wherein the determining includes parsing the data stream to detect for the portion or indication of the secondary data.

12. The method of claim 9 wherein the transmitting includes using a browser program to format the request for wireless network transmission.

13. The method of claim 9 wherein the presenting includes providing a visual indication of the expanded response.

14. The method of claim 9 wherein the presenting includes providing an audible indication of the expanded response.

15. An apparatus for providing a response to a request for service from a wireless device, comprising:
   a receive module adapted to receive a request for service from a wireless device;
   at least one of one or more processing modules being adapted to:
      determine one or more associated service providers based at least in part on the service request,
      retrieve from one or more other servers of the one or more service providers primary response data for responding to the request, and/or
      determine whether secondary data unrelated to responding to the request are to be provided to the wireless device;
   an associate module adapted to associate the primary response data retrieved from one or more servers of one or more service providers with either at least a portion of the secondary data or one or more indications of locations of the secondary data;
   a response generation module adapted to generate an expanded response including the primary response data and the portion or the indication(s) of the locations of the secondary data; and
   a transmit module adapted to transmit the expanded response to the wireless device.

16. The apparatus of claim 15 wherein the one or more processing modules are adapted to:
   generate a data stream containing the retrieved primary response data and the portion or the indication(s) of the location(s) of the secondary data; and
   format the data stream for transmission to the wireless device.

17. The apparatus of claim 15 wherein the one or more processing modules are adapted to:
   obtain an identifier for a user associated with the wireless device; and
   perform at least one task related to the user's identifier.

18. The apparatus of claim 15 wherein the one or more processing modules are adapted to send data for the request to a process that can respond to commands.

19. The apparatus of claim 15 wherein the one or more processing modules are adapted to check a status of a flag as part of the performance of one or more of the determine operations.

20. The apparatus of claim 19 wherein the one or more processing modules are further adapted to update the status of the flag.

21. The apparatus of claim 15 wherein the one or more processing modules are adapted to provide a first indication identifying the retrieved primary response data and a second indication identifying the secondary data for inclusion in the expanded response.

22. The apparatus of claim 15 wherein the receive module is further adapted to receive the secondary data; and the apparatus further comprises one or more storage modules adapted to save the received secondary data, and to provide an indication of the existence of the saved secondary data.

23. A wireless apparatus equipped to process and present a response received from a server to a request for service, the wireless apparatus comprising:
a transmit module adapted to transmit the request for service to a server;
a receive module adapted to receive a response by the server to the request for service;
one or more processing modules adapted to determine whether the response includes primary response data retrieved from one or more servers of one or more service providers responding to the request and either at least a portion of secondary data unrelated to responding to the request or at least one indication of the location(s) of the secondary data; and
a presentation module to present the response having the primary response data and the portion or the indication(s) of the location(s) of the secondary data.

24. The apparatus of claim 23 wherein the receive module is adapted to receive a data stream having the primary response data and the portion or the indication(s) of the location(s) of the secondary data encoded with primary response data.

25. The apparatus of claim 24 wherein the one or more processing modules are further adapted to parse the data stream to detect for the portion or the indication(s) of the location(s) of the secondary data.

26. The apparatus of claim 23 wherein the one or more processing modules include a browser program adapted to format the request for wireless network transmission.

27. The apparatus of claim 23 wherein the one or more processing modules are adapted to provide a visual indication of the expanded response.

28. The apparatus of claim 23 wherein the one or more processing modules are adapted to provide an audible indication of the expanded response.

29. The method of claim 1, wherein the method further comprises the server determining a user associated with the wireless device, and the determining of secondary data is performed based at least in part on the determined user of the wireless device.

30. The method of claim 1, wherein the request is for a reservation service, the primary response data is associated with making a reservation, and the secondary data comprises indication(s) of received email messages or email message(s), or both.

31. The method of claim 1, wherein the request is for retrieval of received emails, the primary response data is associated with retrieving received emails, and the secondary data comprises non-email completion confirmation of prior transactions.

32. The method of claim 1, wherein the method further comprises retrieving the secondary data from one or more remote secondary data providers.

33. The method of claim 1, wherein the method further comprises determining whether the wireless device remains currently connected to a network, and delaying said transmitting until the wireless device is re-connected to the network, if it is determined that the wireless device is not currently connected to the network.

34. The method of claim 1, wherein the request has an associated request type, and the determining of secondary data is further based on the associated request type.

* * * * *